US007702821B2

(12) United States Patent
Feinberg et al.

(10) Patent No.: US 7,702,821 B2
(45) Date of Patent: Apr. 20, 2010

(54) CONTENT-AWARE DIGITAL MEDIA STORAGE DEVICE AND METHODS OF USING THE SAME

(75) Inventors: Eugene Feinberg, Sunnyvale, CA (US); Yuval Koren, San Francisco, CA (US); Berend Ozceri, Sunnyvale, CA (US); Ziv Gillat, Mountain View, CA (US)

(73) Assignee: Eye-Fi, Inc., Menlo Park, CA (US)

( * ) Notice: Subject to any disclaimer, the term of this patent is extended or adjusted under 35 U.S.C. 154(b) by 212 days.

(21) Appl. No.: 11/468,251

(22) Filed: Aug. 29, 2006

(65) Prior Publication Data

US 2007/0073937 A1 Mar. 29, 2007

Related U.S. Application Data

(60) Provisional application No. 60/718,155, filed on Sep. 15, 2005.

(51) Int. Cl.
*G06F 3/00* (2006.01)
(52) U.S. Cl. ............... 710/13; 710/33; 711/111; 711/115; 711/147; 711/170
(58) Field of Classification Search .......... 710/13, 710/33; 711/111, 115, 147, 170
See application file for complete search history.

(56) References Cited

U.S. PATENT DOCUMENTS 5,389,934 A * 2/1995 Kass ............... 342/357.07
5,712,679 A * 1/1998 Coles ............... 348/158

6,405,278 B1 6/2002 Liepe
(Continued)

FOREIGN PATENT DOCUMENTS

EP 1 404 105 A2 3/2004
(Continued)

OTHER PUBLICATIONS

Eye-Fi, Inc., PCT/US2006/034939 filed Sep. 7, 2006, International Search Report and Written Opinion, International Searching Authority-EP, mailed Nov. 27, 2007, 19pp.
(Continued)

*Primary Examiner*—Tariq Hafiz
*Assistant Examiner*—Jasjit S Vidwan
(74) *Attorney, Agent, or Firm*—Sonnenschein Nath & Rosenthal LLP

(57) ABSTRACT

A content-aware digital media storage device includes a host device interface for exchanging digital information with a host device, a memory array for storing digital information received from the host device via the host interface, a peripheral module configured to communicate the digital information stored in the memory array to a receiver located remote from the digital media storage device, and a controller communicatively coupled to the host device interface, the memory array and the peripheral module and configured to interpret directory information associated with the digital information stored in the memory array so as to selectively access said digital information and communicate such accessed digital information to the peripheral module for transmission to the remote receiver. Digital images stored in the memory array may be transmitted to a remote host via a wireless network access point with which the peripheral module of the storage device is associated.

16 Claims, 3 Drawing Sheets

U.S. PATENT DOCUMENTS

| | | | |
|---|---|---|---|
| 7,111,022 B1 * | 9/2006 | Matsumoto et al. | 707/203 |
| 7,503,065 B1 * | 3/2009 | Packingham et al. | 726/12 |
| 2001/0022621 A1 | 9/2001 | Squibbs | |
| 2001/0032335 A1 | 10/2001 | Jones | |
| 2003/0128272 A1 | 7/2003 | Clough et al. | |
| 2005/0134707 A1 * | 6/2005 | Perotti et al. | 348/239 |
| 2005/0235086 A1 * | 10/2005 | Mills et al. | 710/301 |

FOREIGN PATENT DOCUMENTS

| | | |
|---|---|---|
| EP | 1 465 420 A | 10/2004 |
| WO | 01/45388 A2 | 6/2001 |

OTHER PUBLICATIONS

Anita Wilhelm et al.: "Photo Annotation on a Camera Phone"; School of Information Management and Systems, University of California, Berkeley; Helsinki Institute for Information Technology (HIIT); CHI2004, Apr. 24-29, 2004, Vienna, Austria; ACM 1-58113-703-6, Jun. 4, 2004; pp. 1403-1406.

Nancy A. Van House et al.; "The Social Uses of Personal Photography: Methods for Projecting Future Imaging Applications"; Sep. 2004; pp. 1-12.

Nancy Van House et al.; "From "What?" to "Why?": The Social Uses of Personal Photos"; School of Information Management and Systems, University of California at Berkeley; CSCW'04, Nov. 6-10, 2004, Chicago, Ill.; Copyright 2004 ACM 1-58113-810-5/04/0011; (10 pages).

Marc Davis et al.; "MMM2: Mobile Media Metadata for Media Sharing"; University of California at Berkeley School of Information Management and Systems; CHI2005, Apr. 2-7, 2005; ACM 1-59593-002-7/05/0004; (4 pages).

Nancy Van House et al.; "The Uses of Personal Networked Digital Imaging: An Empirical Study of Cameraphone Photos and Sharing"; University of California at Berkeley School of Information Management and Systems; CHI2005 Apr. 2-7; ACM 1-59593-0002-7/05/0004; (4 pages).

Nancy A. Van House et al.; "The Social Life of Cameraphone Images"; School of Information Management and Systems, University of California, Berkeley; Sep. 11, 2005; (4 pages).

* cited by examiner

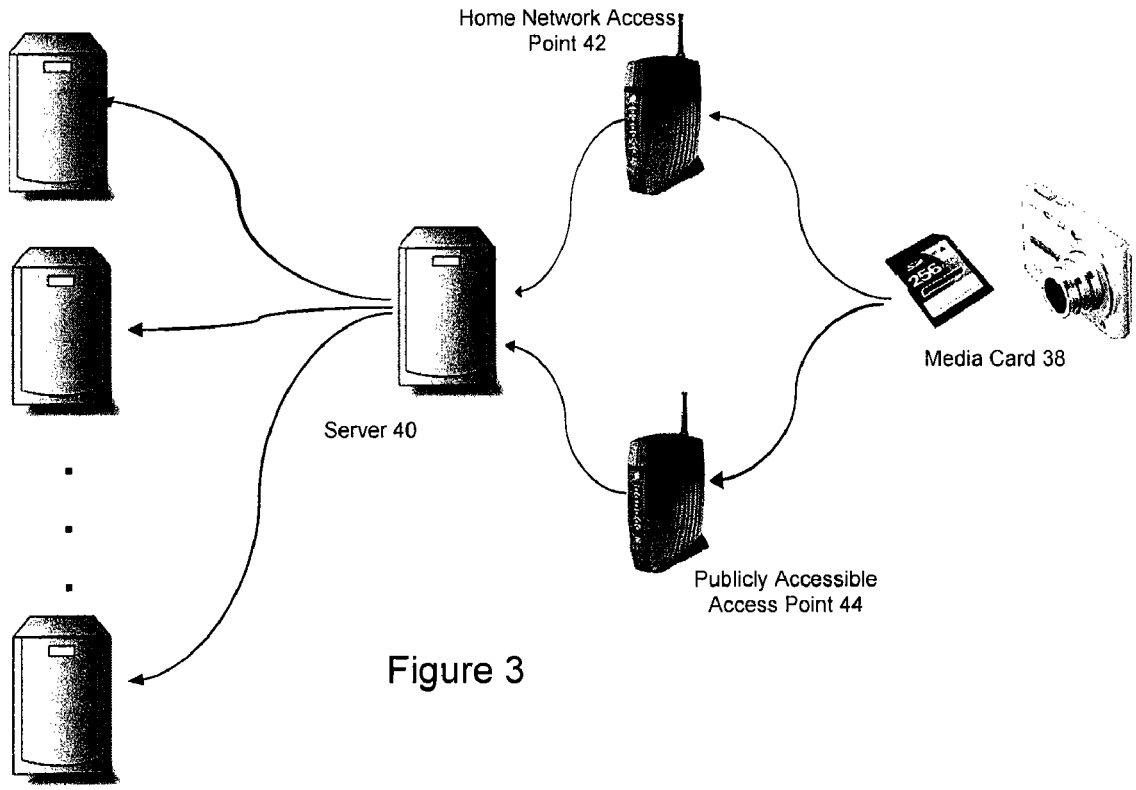
Figure 3
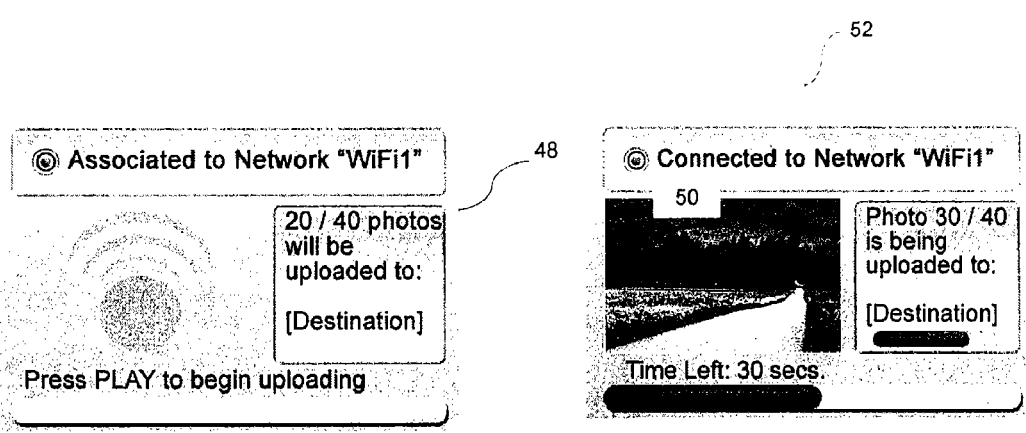
Figure 4A
Figure 4B

CONTENT-AWARE DIGITAL MEDIA STORAGE DEVICE AND METHODS OF USING THE SAME

RELATED APPLICATIONS

This application claims the priority benefit of U.S. Provisional Patent Application 60/718,155, filed 15 Sep. 2005, which is incorporated herein by reference.

FIELD OF THE INVENTION

The present invention relates to storage media for digital media devices such as cameras, audio/video recorders/players, and the like, and, more particularly, to such storage media as incorporate peripheral devices for transferring digital media stored therein via wireless communication links or otherwise processing said media.

BACKGROUND

Devices such as digital still cameras ("DSCs") rely on removable, non-volatile media cards to store image and other data (e.g., metadata concerning the image data). Other digital media devices such as audio/video recorders/players (e.g., mobile phones, personal digital assistants, MP3 players, digital video cameras, etc.) also use such media cards to store a variety of digital media (e.g., images, movies, audio, etc.). Several media card formats exist, including Secure Digital (SD), Multi Media Card (MMC), Compact Flash (CF) I and II, Memory Stick (MS), and xD Picture Card (xD). As used herein, the term media card is intended to refer to all such digital media storage devices, regardless of physical format.

Generally, extracting images or other data from these media cards requires a tethered connection to a personal computer (or similar device) or printer. For example, images can be downloaded directly to hard copy using printers that support physical interfaces compatible with the media card. Alternatively, images may be uploaded to personal computers via card readers or wired connections between the cameras hosting the media cards and the computers.

More recently, digital cameras having wireless network connectivity have become available. These cameras permit connectivity with wireless networks (usually such networks as are compliant with the IEEE 802.11 a/b/g standards) to transfer image data from the media card to a personal computer or printer. However, such cameras are generally more expensive than non-wireless network capable DSCs and, given the present installed base of non-wireless network capable DSCs, represent only a very small portion of the overall number of DSCs available today.

U.S. Pat. No. 6,405,278 to Liepe describes a flash memory card configured with flash memory (e.g., for storing digital images) and an RF transmitter that allows data stored within the flash memory to be transferred via direct wireless communication with an extended storage device having a compatible receiver. Liepe does not, however, discuss the issues of metadata associated with any of the data being so stored or transferred, nor does the reference describe any intelligence resident within the flash card that allows for manipulation of the storage media that is visible to its host. Further, communication between the memory card and the extended storage device is limited to direct communication without provision for making use of wireless LANs and the like.

Davis, et al. have reported on "the social life of cameraphone images" based on a study of multiple users' experiences with specially configured mobile phones having integrated digital cameras. See, e.g., Davis et al., "MMM2: Mobile media Metadata for Media Sharing", CHI2005, Apr. 2-7, 2005, Portland, Oreg. According to the authors, a significant source of frustration for users of digital cameras (whether cameraphones or otherwise) is getting photos off of the host device and onto a platform where they can be shared with others. The MMM2 application allows users of these special cameraphones to add captions to pictures and video captured by the host's camera and to share those images and videos with other MMM2 users via existing networks used by mobile phones. Images stored in the MMM2 database can later be organized into albums, etc.

An important limitation of the MMM2 system is that it requires software upgrades to the host device. Specifically, before the cameraphones could be deployed to the users for participation in the above-described study, they had to be configured with client-side software configured to automatically gather contextual metadata before the images were uploaded to the MMM2 database. Additional client-side enhancements to the cameraphone's existing XHTML browser were required to permit user interaction with the images in order to facilitate annotation and sharing thereof.

While such enhancements to the firmware and/or application software of a host device may be possible or even practical in a controlled and relatively small environment (such as that used for the above-described study), they are not practical (or even, in some cases, possible) in larger arenas, such as the existing installed based of legacy DSCs that are not wireless-network capable. Hence, what is needed is a different solution to address the problem of getting the photos (or, more generally, other digital media) off the host device, especially where such host does not permit easy modification of its firmware or application software.

SUMMARY OF THE INVENTION

In one embodiment, the present invention provides a content-aware digital media storage device having a host device interface for exchanging digital information with a host device, a memory array for storing digital information received from the host device via the host interface, a peripheral module configured to communicate the digital information stored in the memory array to a receiver located remote from the digital media storage device, and a controller communicatively coupled to the host device interface, the memory array and the peripheral module and configured to interpret directory information associated with the digital information stored in the memory array so as to selectively access said digital information and communicate such accessed digital information to the peripheral module for transmission to the remote receiver. The controller is preferably configured to interpret the directory information under the control of computer readable instructions, which may be stored in the memory array or another memory associated with the storage device. Further, the controller may be configured to recognize the type and nature of the digital information stored in the memory array. The peripheral module may be a wireless transceiver and the digital media storage device preferably has a form factor compatible with at least one of the family of secure digital media cards, multi media cards, compact flash (CF) media cards, memory sticks, or xD picture cards.

In a further embodiment, the present invention provides for transmitting a digital image stored in the memory storage array of a removable media card to a host (e.g., accessible via a local area network (LAN), wide area network (WAN), or network of networks such as the Internet) via a wireless radio transceiver included in the media card. Such a transmission is made, in part, through an appropriate wireless network infrastructure device (such as wireless network access point associated with a network conforming to the IEEE 802.11 standards) with which the wireless radio transceiver of the removable media card is associated. From the host the digital image is transferred to an electronic photo album, for example as may be maintained by a third party photo service provider.

Prior to transferring the digital image from the host to the electronic photo album, the digital image may be associated with metadata concerning a location at which the digital image was captured by the digital camera. Metadata may pertain to the identity of the camera user, the identity of other users in the vicinity, a timezone referenced timestamp, or information concerning a location at which the digital image was captured by the digital camera. Such location and timezone metadata may be derived from global positioning system (GPS) data; from information concerning wireless networks determined to be near the media card when the image was captured by the digital camera; from information concerning wireless networks detected by the media card; or combinations of any of the foregoing. In addition, the digital image may be processed so as to be compatible with image format requirements for storage in the electronic photo album.

A further embodiment of the present invention provides for automatically associating a wireless radio transceiver of a removable media card having a memory array storing digital images captured by a digital camera with an access point of a wireless network. Such association is made according to configuration information stored in the memory array of the media card. One or more of the digital images are then transferred from the media card to a computer system, at least in part through the wireless network.

The computer system to which the images are transferred may be a server configured to receive those digital images to transfer same to an electronic photo album, for example an album hosted at a computer resource other than the server. Prior to transferring the digital images, however, those images may be associated with metadata concerning approximate geographic locations at which the images were captured, the timezone in which the images were captured, and other wireless users in the vicinity at that time.

Still a further embodiment of the present invention provides for displaying to a user one or more images retrieved from a memory array of a removable media card according to the status of a transfer of at least one other image from the memory array of the media card to a computer system via a wireless network with which a wireless radio transceiver of the removable media card is communicatively coupled to. The one or more images may be displayed via a display device of a digital camera within which the removable media card is hosted. In some cases the one or more images may be part of a movie. Regardless, however, the images preferably include status information concerning the transfer of the at least one other image.

Yet a further embodiment of the present invention provides for exchanging information between two removable media cards via an ad hoc wireless network established between respective wireless radio transceivers of those media cards. The information may be indicative of proximity of the two media cards to one another and may be subsequently uploaded from the respective media cards to a computer resource.

Once so uploaded, the information from the media cards may be correlated along with profile information concerning users of the two media cards to determine whether or not the users should be advised of the information exchange. For example, the users may be so advised if the profile information concerning the users indicates they have a relationship to/with one another. Such a relationship may be indicated through social network contacts between the users. In the event the users are to be advised of the information exchange, the advisory may be made in a form of a prompt to share digital images with one another.

It is worth noting that some embodiments of the present invention do not require the use of wireless network-capable media cards. Instead, wireless network-capable cameras having conventional media cards may be used. For example, the server-layer functions involving the association of metadata and image data described herein may be performed regardless of whether it is the media card, the camera (or both) that are wireless network-capable. Unlike the MMM2 system described above, the present server-layer operations avoid the need for specialized firmware to be installed on the image capture device.

BRIEF DESCRIPTION OF THE DRAWINGS

The present invention is illustrated by way of example, and not limitation, in the figures of the accompanying drawings, in which:

FIGS. 4A and 4B illustrate examples of a user interface for use with image uploads from a removable media card having a wireless network port in accordance with an embodiment of the present invention.

DESCRIPTION

Figure 1:
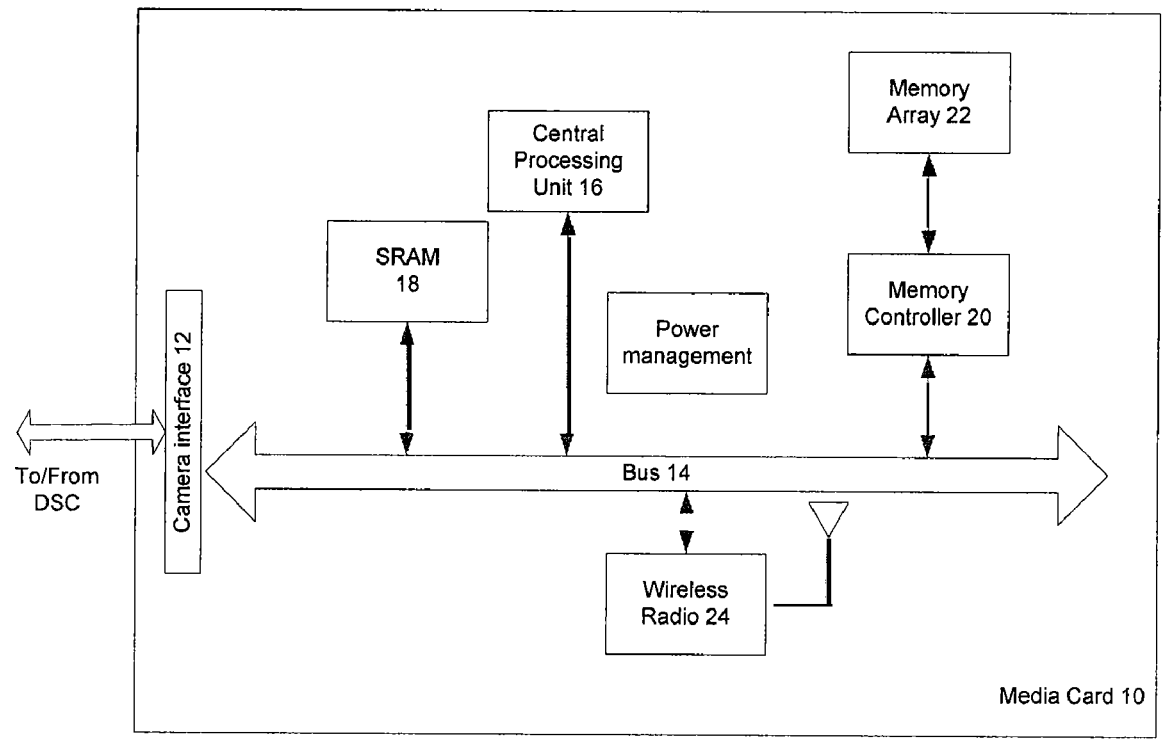
FIG. 1 illustrates a block diagram of a removable media card having a wireless network port in accordance with an embodiment of the present invention.

Described herein are content-aware digital media storage devices. Such devices may be configured to be compatible with existing specifications for media card formats. That is, the present devices may be configured with physical dimensions compatible with such specifications. In this way the present content-aware digital media storage devices can replace or substitute for conventional media cards in legacy devices such as DSCs and other digital media devices.

In the context of the present invention, the term "content" is meant to imply both the file system type and structure employed by the host device and, at a higher layer, the type and nature of the files utilized thereby. Hence, the term "content-aware" is meant to reflect the fact that the present digital media storage devices are configured with intelligence capable of recognizing these file system types and structures and the type and nature of said files. In various embodiments of the invention such intelligence may be implemented as computer-readable instructions to be executed by a general (or special) purpose processing device capable of reading said instructions and acting in accordance therewith (i.e., firmware or, more generally, software) or dedicated hardware configured to perform the functions described herein (or a combination of hardware and software).

In addition to the above-described intelligence, the present digital media storage devices may be configured with various peripherals (e.g., in addition to the memory array and memory controller portions of the device). For example, uni- or bi-directional radio frequency circuitry may be included in the device to permit RF communications between the digital media storage device and a compatible transmitter/receiver/transceiver. In one embodiment, this RF circuitry comprises a wireless two-way radio configured for communications according to the IEEE 802.11 a/b/g standards or other wireless communication protocols, in ad-hoc and/or infrastructure modes. Alternatively, or in addition, the RF circuitry may include a global positioning system (GPS) receiver for receiving information from GPS or similar satellites or pseudolites or other platforms which transmit similar information. Other types of peripherals may also be included.

Other embodiments of the present digital media storage device (with or without the peripherals described above) may include software/firmware/hardware for digital media processing. For example, means for image processing, digital rights management, or other activities or functions may be included. Hence, the digital media storage device may be configured to substantially manipulate the digital media data stored therein prior to transferring the modified (and, in some cases, the original) data off of the storage device (e.g., via RF communication).

Digital media storage devices configured in accordance with embodiments of the present invention include, in addition to a flash memory array, a controller that communicatively couples a microprocessor or similar device (e.g., a digital signal processor, reduced instruction set processor, etc.) configured to execute computer-readable instructions with flash memory array-facing and host-facing physical layer interface logic. In this context, the "host" being referred to is the device (e.g., the camera, audio player or other host device) which will use the digital media storage device as a repository for digital data (e.g., images, audio files, and the like). The microprocessor executes the computer-readable instructions (which may be stored in the flash memory array, a separate memory device communicatively coupled to the microprocessor, or both), which proxy all accesses from the host-facing physical layer interface of the storage device (i.e., the interface with the DSC or other digital device) to the flash memory array.

Unlike a conventional flash controller, the present microprocessor and associated firmware make digital media storage devices configured in accordance with the present invention capable of interpreting and processing the data stored in the flash array. The present firmware uses the file system structure written to the flash array to "mount" the device (before a computer can use any kind of storage media the operating system must make that media accessible through the computer's file system—a process known as mounting), obtain an inventory of files stored thereon, read the contents of those files, and (if desired) make modifications to the file system. Such modifications include, but are not limited to, removing and renaming files, updating file attributes, and creating new files. This is in distinct contrast to conventional flash array controllers, which merely stage the information being written to the storage array in the form of fixed-size blocks of opaque data and take the appropriate actions to write the blocks to the array.

In one embodiment then, the present digital media storage device interrupts the external host from directly addressing the flash array. Instead, all accesses by the host device are proxied and translated by the firmware before resolving to a specific block of data in the flash array. The digital media storage device may be readied for such activities by first formatting the device (e.g., in the conventional fashion), if necessary, and then initializing an internal mapping table to directly map all the blocks that have been written during the format operation and un-mapping all other blocks in the array. As a result, after the operation is completed, only data blocks that contain file system metadata such as the File Allocation Table (FAT), Root Directory Structure and Partition Boot Record have a valid translation from logical block addresses presented at the host interface to physical addresses within the digital media storage device. All other blocks are considered unused and unallocated and are not directly accessible by the host device.

From this initialized state, the digital media storage device maintains persistent databases of free physical blocks within the flash array and logical-to-physical mappings for allocated blocks. In one embodiment, block accesses from external hosts may be intercepted in the following manner:

1) If a block read is requested by the external host and there exists a logical-to-physical mapping for that block address, the corresponding block of data is read from the flash array and returned to the host.
2) If a block read is requested by the external host, but there exists no logical-to-physical mapping for that block address, the digital media storage device fabricates a block data read response of all zeros (or other response) and returns the data to the external host. The flash array is not accessed, nor is any new storage or mapping allocated.
3) If a block write is requested by the external host and there exists a logical-to-physical mapping for that block address, the data provided by the host is written into the flash array at the corresponding physical address.
4) If a block write is requested by the external host, but no existing logical-to-physical mapping for that block address is present, a currently unmapped physical block is taken from the digital media storage device's internal persistent database of free physical blocks and a new mapping is created from the block address provided by the host to the physical address of the allocated block. The data provided by the host is then written to the flash array at that physical address. If no free physical blocks are available, a block-level device access error is returned to the host.

This dynamically-allocated logical-to-physical block address mapping scheme allows the present digital media storage device to reorganize the data in its flash memory array without external, host-visible side-effects. Furthermore, augmented by the firmware's understanding of higher-level FAT file system semantics, it allows the present storage device to manipulate the contents of files or folders stored in the flash array, without any explicit cooperation or synchronization from the external host device's software. Stated differently, the advantages afforded by the present invention (e.g., the ability to manipulate the data stored in the flash array) require no change to the physical host's existing firmware or application-level software. Hence, the drawbacks of the MMM2 scheme described above are avoided.

FIG. 1 illustrates an example of a digital media storage device in the format of a media card 10 configured in accordance with an embodiment of the present invention. As illustrated, media card 10 includes an interface 12 for communication with a host (e.g., a DSC or other digital device). The physical and electrical make up of interface 12 will depend on the type of media card used (e.g., CF-I, CF-II, SD, etc.) but such interfaces are well known in the industry and need not be described in detail. Stated differently, such an interface is entirely conventional in nature and conforms to the relevant industry specifications therefor, depending on the type of media card being used.

The host interface 12 is coupled to a bus 14 which is used for communicating electrical signals within the media card 10. In some cases bus 14 may be a dedicated bus between the interface 12 and a central processing unit (CPU) 16, while in other cases it may be a more general bus used for communications between the CPU and other components as well. As with interface 12, the CPU 16 (which is communicatively coupled to bus 14) is a conventional feature of such media cards. In some embodiments a read/write memory (such as an SRAM) 18 may be used. This provides a convenient storage location for CPU 16 when performing computations and the like. SRAM 18 may be communicatively coupled to bus 14 (as shown) or may be communicatively coupled directly to CPU 16 through a private interface (e.g., a separate memory bus).

A memory controller 20 and associated memory array 22 are also present and the controller 20 is communicatively coupled to bus 14 and to the array 22. In the illustration a flash memory array and flash memory controller are shown, however, other storage media and associated controllers may be used. For example, a relatively new form of storage device incorporates a mini hard drive and associated controller within a physical format compatible with conventional CF-II media cards. Such storage devices may be used in connection with the present invention, which is storage format-agnostic.

Also included in media card 10 is a wireless radio transceiver 24, which may be communicatively coupled to bus 14 so as to communicate with CPU 16. The wireless radio 24 is an example of the peripherals discussed above and in this embodiment preferably conforms to the IEEE 802.11 a/b/g specifications, but in other embodiments other forms of wireless radios or even other peripherals may be used. For example, wireless radios conforming to the Bluetooth™ and/or GPS specifications may be used. Alternatively, or in addition, wireless radios conforming to the IEEE 802.16 standards may be used. The precise nature of the peripheral port is not critical to the present invention, though in several of the applications described below a peripheral device that provides wireless communications for media card 10 is required.

What is important is that the physical dimensions of the media card 10 are compatible with existing media card interfaces of various hosts, such as DSCs and the like. In the past, media cards with wireless network functionality have been larger than their non-wireless capable counterparts. DSCs (and other digital devices) usually (or often) enclose their media cards in the body of the host device. As a result, the larger, wireless-capable media cards were incompatible with many existing host devices. The present media card 10, however, is sized so as to fit within legacy host media card housings.

Other incompatibility problems which have prevented the use of media cards with wireless functionalities with various hosts are even more difficult to overcome. For example, prior media cards that have incorporated flash memory with wireless network capabilities have required the host device to support them with appropriate software drivers, making them incompatible with existing and legacy hosts. That is, existing hosts simply do not contain the firmware needed to operate with previously available media cards having these functionalities. In contrast, the present media cards are "self-hosted", meaning that they require no such firmware support from the host device. Instead, the present media cards themselves act as a host device with an onboard network interface but present to the camera or other digital device with which the card is being used as a conventional block storage device. This means that the firmware used by existing and legacy host devices need not be altered in order to read and write images, audio files or other digital content, and metadata, to/from the present media cards.

In addition, a portion of the memory array 22 may be reserved for storing the upload status information for images being transferred off of the media card. For example, in the case of a media card with a wireless radio that is used in connection with uploading digital images, maintaining information regarding the status of any such uploads over the wireless network may be important so that in cases where such transfers are interrupted, they can be resumed from a proper starting point once communications with the wireless network have been reestablished. Further, maintaining such status information will also provide the media card with the ability to determine when the original images can safely be removed from the media card memory array.

Figure 2:
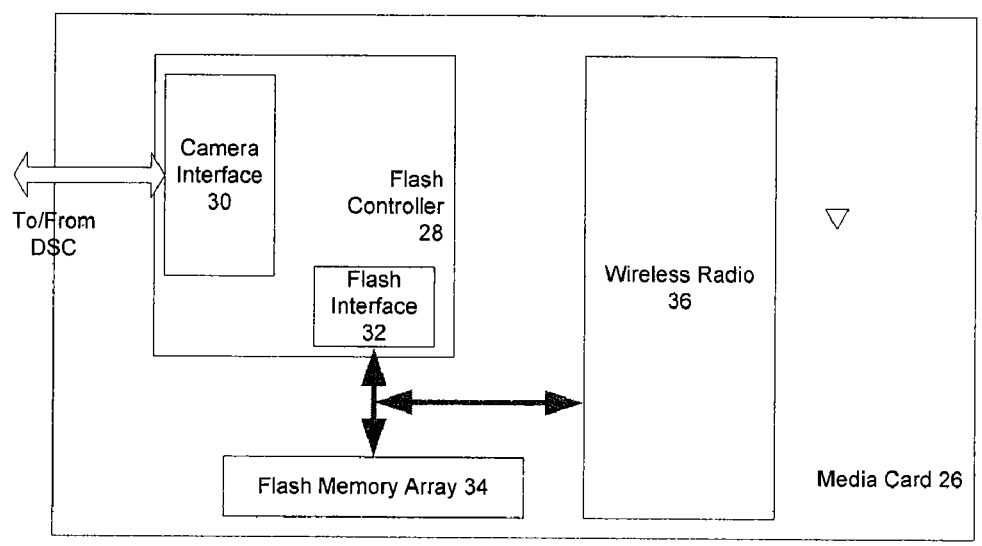
FIG. 2 illustrates a further example of a removable media card having a wireless network port in accordance with an embodiment of the present invention FIG. 3 illustrate an example of a wireless network configured for use with a removable media card having a wireless network port in accordance with an embodiment of the present invention.

FIG. 2 illustrates a media card 26 configured in accordance with an alternative embodiment of the present invention. In this media card 26, a flash memory controller 28 includes a host interface 30, for example an SD or CF-I/CF-II interface. Controller 28 also includes a flash array interface 32 which is communicably connected to the flash memory array 34. In this example a NAND flash memory array is used, however, in other embodiments a NOR flash memory array may be used.

The media card 26 also includes a wireless radio 36, which is communicably coupled to the flash controller 28 and the memory array 34. The wireless radio 36 may be a self-contained 802.11 a/b/g compliant communication device that includes both a media access controller, a RISC processor (with it attendant read/write memory and flash memory for storing intermediate results and computer-readable instructions, respectively) and the wireless radio front end. The flash controller may be such a controller as is available from Hyperstone AG of Konstanz, Germany, the memory array 34 may be a NAND flash array as is available from Samsung, Inc. of Seoul, Korea, and the wireless radio may be such a module as is available from Atheros Communications Inc. of Santa Clara, Calif. As indicated above, all of these modules are integrated within a single SD or CF-I/CF-II card form compatible with existing host devices.

The wireless nature of the secondary interface (the interface with the host device is considered the primary interface for the media card) allows digital content (e.g., images) to be transferred onto or off of the media card while still enclosed within the host's media card slot. Working from within the media slot allows the media card to draw power from the host device, eliminating the need for an integral battery. It is also possible to operate the media card and its wireless interface outside of the host, provided power is supplied via the host interface (12, 30), or alternatively, in an embodiment that integrates a battery onto the media card. As indicated above, to enable wireless transfer functionality the present media card adds a wireless radio (e.g., an IEEE 802.11 a/b/g radio or Bluetooth radio, etc.), a media access controller (MAC), and an embedded host CPU to the conventional flash controller functionality. Software components for interpreting the host's file system and data stored in the memory array, connecting to local area and/or other networks (e.g., via TCP/IP protocols) and managing low-level driver tasks of the wireless interface hardware are all included for use by the embedded host CPU.

As discussed, media cards configured in accordance with present invention can be used in connection with a variety of devices, such as DSCs, digital video cameras, mobile phones, personal computers, personal digital assistants, and similar devices. Much of the discussion below will focus on the use of such media cards with DSCs and further details of the firmware operation for the specific instance of a DSC writing image data to a digital media storage device configured in accordance with the present invention are presented below. However, it should be remembered that this is being done only so as to provide an example of the present invention. The overall scope of the invention is reflected in the claims following this description and that scope should not be unnecessarily limited in view of the DSC examples presented herein.

Media cards that integrate a storage device with a wireless communication system in accordance with the present invention may be compliant with any existing media card format (e.g., SD, MMC, CF, MS, or xD) so as to be compatible with a wide variety of DSCs and other hosts. In the case of a camera host, having an integrated wireless communication device allows users to upload images (or other data) from the camera (i.e., the media card) to an alternative device (e.g., a personal computer, a server or storage location associated with a local area network, or an Internet-based computer/storage resource, etc.) at the time the image is captured (if wireless communications are available) or at a later time, without having to tether the camera or the media card to a physical interface (e.g., such as a universal serial bus (USB) cable or other interface). In the case where images are uploaded to an Internet-based computer/storage resource, those images can be managed through any conventional Web browser, either using a personal computer, television and set-top box combination, mobile phone, or similar communication device.

Having thus described various media cards configured in accordance with the present invention, we turn now to a discussion of various applications for such media cards as configured with one or more wireless network ports. In doing so, however, it should be recognized that these applications do not necessarily require the use of media cards as described above. That is, in some cases the media card functionality may be integrated within the host device itself instead of being resident in a removable media card. While such solutions are not appropriate for legacy devices (at least not without substantial refit of those devices), they are appropriate for future host devices which need not be designed to include removable media cards. So, although the discussion below assumes the use of a media card configured in the manner discussed herein, the present invention is also applicable to host devices which include such features and functionality in the absence of such a media card.

Additional embodiments of the present invention provide the ability to "tag" images with location information, time and/or date information, or other metadata, providing alternative means of image management. In some cases, the wireless communication devices integrated with the media cards allows such cards to exchange cookies or other information elements with similarly configured media cards that are in proximity with one another (e.g., in an ad-hoc network fashion). This information can be used (in some cases in combination with social network information) to facilitate sharing of images among users.

Using the present media cards may involve registering same with a service provider, for example via a hosted Internet Web site or another computer-based resource. Such registration may allow for configuring the media card with network connection preferences and the like and may also establish initial preferences for uploading of images to one or more designated storage locations. For example, a user may specify a preference to upload images to an existing electronic photo album maintained by the user. As indicated above, several services already exist for hosting such albums. Network parameters such as network names or service set identifiers (SSIDs), encryption keys and the like may also be stored to the media card's private partition so as to facilitate communication with a preferred network (e.g., a user's home network). In other cases, passwords associated with third party wireless network accounts held by the user may be so stored so as to facilitate communication between the media card and so-called wireless network "hot spots" (i.e., publicly accessible wireless network access points maintained by third parties). Configuring the media card in this fashion may require the user to interface the media card with a personal computer for the initial registration process.

Once the media card has been configured for use with one or more wireless networks it can be inserted in the host (here we assume a DSC for convenience). As images are captured, save/delete decisions can be made in-camera, in the conventional fashion. The media card will report (via the host camera's display) network availability (e.g., by displaying an appropriate predefined image stored in the media card via the camera's image viewing screen). This allows a user to decide whether or not to connect to an available network and upload images to the previously configured destination storage location. Upload status may be displayed on the camera display (e.g., again using one or more predefined images). Thereafter the user can visit the storage location (e.g., by accessing his/her electronic photo album), and print or otherwise interact with his/her images.

By including the wireless network functionality in a media card, host compatibility is assured. That is, from the stand point of an existing DSC (or other device), the present media cards resemble conventional storage devices with a compatible interface. The wireless network functionality need not be exposed to the host's processors or other components. This allows the present media cards to be functional with the existing installed base of non-wireless capable host devices while at the same time expanding the functionality of those devices to permit wireless connectivity. Consumers remain free to purchase a camera (or other host device) of their choice and add wireless functionality through selection of a media card. Consumers can also choose a photo portal (or other digital media storage facility) that meets their needs, rather than having such a portal be associated with their camera.

As more fully discussed below, a server layer isolates the present media card from the diverse photo portal interfaces. That is, rather then directly connecting to a third party photo portal or other storage locations (as was described in the scenarios posited by Liepe), the present media cards will upload images through a known host (and here the term "host" refers to a computer-based device and not the "host device", such as a DSC, into which the media card is placed), for example a host on a LAN or accessible via a WAN and/or the Internet. This host will, in turn, store the images to the photo portal of the user's choice (e.g., after performing any necessary image resizing or transcoding or other digital content processing). The user can store his/her preferences with the host (e.g., as preferences for a user account), among which may be the designation of a destination photo portal or other storage location.

The use of this intermediary host allows for providing additional functionality. For example, automated enhancement features (such as red eye reduction for images) may be provided. In addition, the use of such a host may allow for secure transfers across open wireless networks, such as are common at third party Internet cafes and the like. In some embodiments of the present invention, geotagging and/or timestamp correction as well as image archiving capabilities (e.g., to alternative storage media such as CDs or DVDs) may be provided through the host. Finally, the host acts as a platform for distributing firmware and "hot spot" (or other roaming) list updates to the media card.

Thus, among the capabilities delivered by media cards configured in accordance with the present invention is the upload of images to third party portals and image finishing service providers without need for tethering the host camera or media card to a personal computer. Current digital photography workflows typically require users to perform multiple steps to deliver images to portals (e.g., as may be found on a LAN or accessible via a WAN and/or the Internet). Typically, users must first transfer the images from their cameras to their personal computers, and then run either Web-browser-based or custom client software provided by the portal service provider (e.g., Snapfish™, Shutterfly™ or Ofoto™) to upload those images to the portal. Users can then manage their electronic photo albums and order products based on their images, from simple prints to photo books, apparel or accessories imprinted with their photographs, archival media, etc.

The present invention removes the need for users to stage uploads of images via their personal computers by transferring images from the media card to a managed server layer, and from there to one or more photo service providers. Referring now to FIG. 3, when the user initiates an upload from a media card 38 configured in accordance with the present invention, the upload agent resident in the media card contacts the managed server 40, authenticates the user, and then uploads the images to the server using a specified transfer protocol. The connection to the server 40 may be made through a wireless network access point 42 associated with the user's home (or other) network, or via a public access point 44 as operated by a third party service provider. Such an access point is generally part of a computer network (not shown) that provides access to the Internet or other network (e.g., a LAN) through which server 40 can be reached. Such networks are conventional in nature and so are not shown in this diagram.

Once the images have been received at the server 40, software resident at the server accesses the user's account to determine where to store those images. Such storage may be co-resident at the server 40 (or an associated storage device or network) or may be associated with an online service provider 46 the user has designated to receive the images. Each of these service providers has its own specifications for images to be uploaded, so if any resizing, transcoding or other image manipulation is needed server 40 can perform such tasks before uploading the images to the third party provider's Web site (again, such a transfer may be made via the Internet or other computer network, which is not shown here so as to keep the present drawing simple in nature). Where so specified by a user, a variety of photo-finishing and photo-sharing preferences may be implemented and the images transferred to more than one third party provider. For example, the server 40 may upload the images to a on-line image storage location associated with one third party service provider and to the user's own Web site and/or Web log (blog), hosted by a different service provider. In some cases, the third party service provider may be a social network provider such as LinkedIn™ or Friendster™.

In order to facilitate the above-described processes, the present invention provides a binding of a media card to a user. On example of such a binding makes use of a unique identifier for the media card, for example a serial number or media access controller (MAC) address, preferably associated with the card at the time of its manufacture. The assignment and use of such MAC addresses is well known in the computer networking arts and so will not be described further herein. This unique identifier can be used as an index to a particular user's account at the server layer, requiring no user-identifying information to be stored on the media card. Alternatively, user-identifying information may be stored on the media card for use in connection with operations for which server access is not required (e.g., interaction with a photo kiosk).

The presence of the server layer in the above-described process frees the media card from the burden of connecting directly to a dynamically-changing multitude of service providers and managing each provider's custom transfer protocols within the constrained hardware/software environment of the media card. The server layer can offer a variety of functionality, which is in most cases complementary to those offered by the third party portal services. For example, server 40 may be configured to perform any or all of the following actions:

1) Handle interrupted or duplicate transmissions gracefully. That is, in the event any media card-to-server transmissions are interrupted, then to avoid sending a potentially corrupt or incomplete image file to the portal destination the server 40 may be configured to request retransmissions of such images upon a successful reconnection to the media card. Similarly, the media card may be configured to record information concerning which images have already been successfully uploaded so as to avoid sending duplicates thereof. Where such functionality is not implemented, server 40 may be configured to compare newly received images to previously received ones and eliminate duplicates so that multiple copies of the images are not stored to the third party sites. This can help reduce costs associated with such storage and/or relieves the user from having to perform such deletions at a later time. In either case, duplicate images may be detected in a variety of ways, from comparison of metadata associated with the images (e.g., time stamps or file numbers) to actual image comparisons.

2) Provide feedback to the card and possibly the user as to successful transfer completion. Server 40 may be configured to wait until all images have been successfully uploaded thereto before initiating any transmissions to the third party service provider sites. In this way, users can be assured of not deleting images from media card 38 before they have been successfully transferred to off-camera storage. In other cases, images may be deleted from the media card as soon as they have been successfully transferred to server 40 (e.g., upon receiving an indication from server 40 that the upload was successful). Deletion may be performed automatically by the card or manually by the user.

3) Resize and transcode images to meet portal requirements. As indicated above, such actions may be necessary to comply with requirements for uploading the images to the third party sites.

4) Act as an e-mail, MMS (cellular), and/or RSS (Web syndication) gateway. Here, the server 40 provides services that enhance the ability of the user to distribute his or her electronic images. Server 40 may be configured to deliver the images as e-mail attachments to pre-designated e-mail addresses (e.g., such as the user's personal e-mail address or other e-mail addresses) and/or to e-mail addresses specified by the user after the images have been uploaded to server 40. In addition to e-mail delivery, images may be communicated by MMS, which is a service used by some mobile phones, RSS, which an emerging syndication service based on the extensible markup language (XML), or other means.

5) Secure transfers across an open wireless network. Many wireless networks, especially those intended to be publicly accessible, operate without any form of encryption. Users may feel less secure about transferring their images across such networks and so server 40 may be configured to establish a secure session with media card 38 for the transfer of any images. In such cases, media card 38 would need to be configured with sufficient functionality to take part in such a communication process. For example, media card 38 may need to be configured with an appropriate digital certificate to participate in secure socket layer (SSL) communications with server 40. Image data would be encrypted at media card 38 prior to transmission to server 40, where it would then be decrypted. Thus, even if the wireless network itself operated without encryption, the media card-to-server communications would remain secure.

6) Provide automated image enhancement (e.g., red-eye reduction). Where desired, some image enhancement or other processing could be performed (typically under user direction) on the images as they are stored at server 40 before they are uploaded to other sites. Such services may be provided on a fee basis or otherwise.

7) Provide geotagging and timestamp correction. As discussed further below, geotagging and other services may be provided to permit users to better manage their images. Such services can also be used in conjunction with social network functionality to permit users to share images that were captured in similar locations and/or at similar times, etc.

8) Archive images to CD or DVD (or other media). Again, such services may or may not be provided on a fee basis as an alternative to archiving solutions offered by third parties.

Once the images have been successfully stored or uploaded to the user's choice of providers, server 40 can so advise the media card 38 so that storage space on the card can be automatically freed up. Alternatively, receipt of the images at server 40 (vs. a final destination for the images) may be sufficient for the server to advise media card 38 that the storage space can be made available for new images. That is, the media card can be permitted to overwrite memory locations at which image data was previously stored once the images have been successfully transferred off the camera. This allows the user to continue taking pictures without running out of storage space on media card 38. The uploaded images may be managed using the tools provided by the online photo-finishing and photo-sharing service providers, leaving the remainder of the user's photography workflow unchanged and undisrupted.

Most wireless networks, including the popular 802.11 a/b/g variants, require the user to provide configuration information to find and associate with a network. Optionally, security tokens may be required to authenticate and encrypt the connection. As discussed above, networks available for use with the present media cards include an individual user's home wireless network, enterprise wireless networks, and free or for-pay "wireless hot spot" networks available at many commercial locations such as coffee shops, bookstores, airports and hotels.

An important feature of the present media card is that it requires no specific software support from its host camera for managing and configuring the wireless interface. Thus, the card is compatible with all legacy cameras that support its card-type interface. Moreover, the media card does not require any user input/output conduits of its own. This does not, however, mean that the media card requires no initial configuration. Instead, the required configuration information must be stored on the media card before it is inserted in the host camera. This configuration information is needed so that the media card can associate with at least one known network.

The configuration information for this "initial" network may be stored in the media card's private partition or provided by coupling the media card with a personal computer (e.g., via a media card "reader" connected to the personal computer through an interface such as a USB port) and running a configuration utility. This utility permits the user to store the configuration information for one or more wireless networks on the media card. In one embodiment the configuration information is stored to the media card's memory array as a file using the file input/output facilities provided by the computer's operating system or the picture transfer protocol (PTP) for cameras that support it. The camera hosting the media card has no use for such a configuration file, as it does not represent image or other digital photography data, and so the file may be stored in a separate directory from that where images are stored. Such a configuration file will, however, be compliant with the camera's file allocation table (FAT) file system. In some cases, configuration information for access to public wireless networks may be preloaded in the media card, allowing for use thereof without any need for initial configuration of the card via a user's personal computer. Such configuration via a personal computer (or other, similar means) would still be required in order to make use of private (e.g., home, office, campus) networks.

This file system modification occasioned by the storage of the network configuration information is detectable by the extended functionality of the media card and the newly stored data is interpreted by the media card firmware to extract the network information and configure the wireless interface accordingly. Such network configurations are well known in the wireless network arts and need not be repeated here. What is important for purposes of the present invention is that the configuration file is stored to a known memory location within the memory array of the media card. Computer-readable instructions stored on the media card are executed by the CPU thereon and, as a result, the CPU is instructed to read this memory location and configure the wireless radio in accordance therewith. Such configuration information may include, for example, the MAC address of a wireless network access point, the SSID therefor, the channel number for the network, any security keys (if used by the network) and other information needed to associate the media card with the access point. Once the media card is able to associate with at least one wireless network and is able to connect to the server, all of the user's management tasks can be accomplished through a Web interface and any new configuration information pushed to the media card by the server.

The presence of a wireless interface in the media card also permits the digital photographer to upload pictures to photo-sharing sites while away from home (and, therefore, away from the user-configured "home" network). Typically, the networks needed for such "on the road" uploads are "wireless hot spots", which may or may not be free. Media cards configured in accordance with the present invention maintain a "roaming list" of such wireless hot spots and the configuration and authentication information required for gaining access thereto. In the case of free wireless hot spots, no authentication information may be required, though web forms may have to be processed and completed to proceed. "Pay per use" billing at commercial hotspots can be supported by informing the user of the cost of such sessions before they are initiated and billing handled by an interaction between the server layer and the network provider.

Earlier, the concept of geotagging of images was mentioned. Digital cameras typically associate non-visual information (so-called metadata) with images (usually at or about the time the image is recorded). Such information can include the date and time the image was captured, the camera settings used to take the image and user-customized comments. The EXIF standard allows for the addition of arbitrary chunks of binary data to digital images and provides standardization for certain types of data, including geographical location information. Geographical data of this type is not typically inserted by digital cameras, but rather is inserted in "post-processing" of images by correlating the time stamps of images with a recorded GPS (global positioning system) trace made by the photographer. The separate nature of the geographical data and the image/time stamp data and the resulting need to marry the two in post processing makes geocoding of images a cumbersome and niche feature using conventional workflows.

In contrast, the present media cards can automatically associate geographical location information of varying accuracy levels with images captured by any digital camera. In one embodiment, the media card can have access to GPS data with high accuracy. Such information may be provided by a GPS receiver integral to the media card, or relayed via a local wireless link (e.g. Bluetooth) from an external source of GPS data.

Alternatively, the user's approximate location at the time an image was captured can be deduced by detecting wireless networks in the vicinity and correlating the list of networks so detected with a database containing a mapping of networks to geographical locations. Wireless networks, such as 802.11-compliant networks, are typically identified by a user-customized "network name" (the SSID) and a hardware-provided MAC address (assigned uniquely at the time the access point is manufactured). Hence, such networks can be uniquely identified. Recently, commercial and volunteer-assembled databases have been established which provide mappings of these unique access points MACs (and, in some cases SSIDs) to location coordinates (e.g., GPS coordinates). Since the present media cards are configured to operate with wireless networks, the media cards are capable of detecting the SSID and MAC information broadcast by any nearby access points.

In one embodiment of the present invention this network identification information is recorded on the media card at or about the time an image is captured (or at other times as such wireless network identification data is received by the media card) and associated with images and/or with timestamp information. That is, the network identification information may be recorded at approximately the same time one or more images are captured and associated with those images in the same way as other metadata. Alternatively, or in addition, the media card may record such network location information as it encounters various access point broadcasts, whether or not any images are actually captured at those times. Such information can be recorded along with timestamps to act as a sort of digital record of the movement of the media card among various wireless network areas.

In either case, once the images have been uploaded to the server layer or elsewhere, the network identification information may be used to index appropriate databases to derive geographic location information for those networks. The geographic location information may then be associated with the image data to geocode those images. In the case where the network location information was recorded at or about the same time as the images, the approximate location of the images will be available. In the case where the network information was simply captured as it was available, the actual location of the images may not be available, but its approximate location may be deduced from an analysis of the network information (and resulting geographic information) captured at times before and after the times the images were captured. In still further embodiments, both data sources (GPS data and network identification data) may combined in a form of assisted GPS to geocode the images.

Once digital images have been geographically tagged, photo album management tools and Web interfaces can take advantage of this additional information to present the user's photo collection in a spatial manner (in addition to the traditionally employed chronological methods). Furthermore, the user can be offered enhanced photo search capabilities such as finding all photos taken near a location or landmark without requiring the user to remember when s/he took a particular picture.

The passive scanning of wireless networks to ultimately derive geographical location may be termed "bread crumbing". It is known that access points for all infrastructure (as opposed to ad-hoc) 802.11-compliant wireless networks transmit a periodic beacon packet to advertise their presence to mobile devices that may seek to access their respective networks. The access-point is typically both the managing entity of the network and the point at which the wireless network is bridged to a wired network. The beacon packets contain the unique MAC address of the access point (a 48-bit binary string), as well as an optional (but typically provided) human-readable network name (the SSID). Receiving the beacon packet does not require the receiving station to have any additional information for accessing the network, such as authentication and encryption keys.

While it is probably not practical for a media card configured in accordance with the present invention to keep its wireless transmitter on at all times, periodically turning on the wireless receiver to detect the presence of 802.11 beacon packets in the vicinity represents only an incremental power drain on the battery of a host camera. Thus, media cards may periodically power up their wireless receivers to record wireless network beacons. The record represents a network-domain breadcrumb trail of where the photographer has been (at least while the camera was powered-on).

Once such a breadcrumb record of wireless networks is available, the media card can employ any of several methods to convert the information into a trace of geographical locations:

1) In one case, requiring the least amount of additional storage burden on the media card and power drain on the camera's battery, the captured information (e.g., access point MAC address and SSID) of the most recently encountered wireless network is associate with any images taken by the user. This data can be stored directly into EXIF-compliant headers of the JPEG image file written by the camera or can be stored in a second file named according to the naming convention of the camera, but with a different filename extension than that of an image file. When the user's pictures are uploaded via the wireless interface, the server layer may convert the network information stored with each image into a geographical location by consulting a database. Using heuristics to match network detection events and image capture times, the server may then insert image location tags into the EXIF headers of the image before transferring it to the user's preferred online provider.

2) In an alternative embodiment, if the media card has sufficient on-board non-volatile storage space to contain a mapping of global or regional network information to geographical location, the conversion of network information to location information can be done in an entirely camera-resident manner. The "in media card" database can be kept up to date by transferring any necessary updates during the user's connection to the server layer for uploading images.

3) In yet a further embodiment, the camera can take advantage of opportunistic connections to wireless networks to request from the server layer the conversion of network information to geographical information, without actually transferring any images. In this mode, the media card may keep track of which images have geographical information in the raw form of network information and consult the server layer to look up the actual geographical information. When the server layer provides that information it can be associated with the image information in the media card.

While many mappings of wireless network access point information to geographical location databases are presently being compiled, the opportunistic collection of such information may result in incomplete coverage of geographical information based on that one source alone. To alleviate such coverage sparseness and augment the geographical location data, the present media cards may also use layer 3 (IP address)-based deduction of geographical location.

Layer 3 access to the network requires the media card to associate with a wireless network and receive a dynamically allocated IP address from the managing access point (typically through a communication protocol like DHCP (dynamic host configuration protocol)). While a camera is powered on, if the media card finds a wireless network with which it can associate, it can probe the network using IP packets of increasing TTL (time- to-live) thresholds to find the Internet-wide public IP address of the access point it is connected to. This IP address can then be used by the server layer in a fashion similar to that discussed above to obtain a mapping of the IP address to geographical location of the access point.

Note that the network based/network assisted geotagging of images described herein is not limited to images captured on media cards having wireless network interfaces. That is, similar operations may be performed using DSCs having wireless network interfaces other than as included in a media card. As noted above, a small number of DSCs are starting to incorporate such wireless network capabilities. The present geotagging techniques are equally applicable where such cameras are used to capture images to conventional media cards.

Given the large, high resolution image files captured by DSCs and the often limited upstream bandwidth provided by the (typically wired) network backhaul, e.g., past the point at which the local area and wide area networks are bridged, upon connection of the media card to a wireless access point it may be desirable (for reasons of bandwidth limitations determined after connection of the media card to the wireless access point or user preference) to transfer lower resolution versions of all captured images quickly, before performing uploads of the high resolution counterparts. For example, thumbnail images (e.g., having 160×120 pixel resolution) are typically embedded into the full resolution image file header. In one embodiment of the present invention these thumbnails are extracted from the image files and transmitted, with no additional image processing required. Alternatively, or in addition, screen resolution images (approximately 640-800 pixels on the long side) can be generated by scaling the full resolution images using certain predefined scaling ratios (e.g., 1:1, 1:2, 1:4, 1:8 or 1:16), as described below. The scaled images may then be uploaded in the fashion described above for the thumbnails. These scalings are relatively less computationally intensive than arbitrary scaling operations. In cases where a precise resolution is desired, a final up or down scaling operation can be performed at the server layer once the scaled image has been uploaded.

In still further embodiments of the present invention, media cards configured with wireless radios may operate in a peer-to-peer fashion. In such a configuration, media cards may transmit a beacon, advertising their presence to other similarly configured media cards. Individual cards may be uniquely identified through individual MAC addresses. As media cards encounter one another they may associate with one another (e.g., via ad-hoc networks established between their respective wireless radios) and record one another's MAC address, perhaps with associated timestamps. Such ad-hoc networks and their establishment are features well known in the art. However, the use of such networks to record the proximity of users of removable media cards is, to the knowledge of the present inventors, something not heretofore done. In other cases, the media cards need not actually establish ad-hoc networks with one another and instead may simply record the observance of another media card's beacon. In some embodiments, beacon parameters (such as times of transmission and whether or not such beacons are hidden or visible by other media cards) may be set by users as part of the configuration routine for a media card.

Thereafter, once this information has been uploaded to the server layer (along with the image data, etc.), this "encounter" data may be associated with user profile information that specifies a particular user's contacts or other social network. If matches are uncovered, indicating that a user's media card encountered a media card of one of the user's contacts or other designated individuals, the user may be so informed. This may act as a prompt for the user to share images with the "encountered user" or otherwise communicate with that individual.

The "peer-to-peer" exchanges described above are not restricted to media cards having wireless network capabilities. For example, wireless network-capable DSCs may engage in similar "encounters" with one another. As was the case for the media cards, the DSCs may record the observance of one another's beacons (with or without establishing an actual ad-hoc network) and report such encounters to a server layer when communicatively coupled thereto (e.g., as part of a session during which images are uploaded to the server). The encounter information may be used to initiate a search for social network connections between the users associated with the DSCs (or, more generally, the wireless transmitters that recorded the encounter as such wireless transmitters may be associated with the DSC, the media card, or a peripheral device attached to or associated with the DSC).

Additional peer-to-peer exchanges may involve images themselves. That is, media cards and/or DSCs configured in accordance with the present invention may be configured to exchange images with one another over ad hoc wireless networks. Appropriate user interfaces can be included with the DSCs or media cards to permit user control of such exchanges. For example, users may be able to permit or deny such exchanges when media cards/DSCs in proximity to one another establish the ad hoc network. In some cases, these interfaces may include user-defined address books configured to identify known associates of a user when beacons or other identifying criteria from a nearby media card/DSC is/are received.

Several operational modes for image uploads are available. In an opportunistic mode, the media card will associate with a wireless network and begin uploading images (or resume a previously interrupted upload) whenever it finds an available wireless network. In a user driven mode, association with wireless networks will be limited to pre-configured networks or undertaken only with user authorization.

Media card behavior in either basic operational mode may be further controlled by a set of media handling policies, cognizant of the relevant attributes of the media card and its user, the server to which it has connected (on the LAN or WAN), and the physical and/or network environment in which the media card finds itself. These attributes may include, but are not limited to, the following:

Place and time, relative to both physical position and network context

User identity or group affiliation

Device type or specific identity, potentially as authenticated to the server

Server type or specific identity, potentially as authenticated to the device

Device and/or Server Copyright policy

Network bandwidth availability and/or cost of said bandwidth

Based on these attributes, policies in place may refine the basic operational mode to determine whether and which media should be moved, and any additional processing required pre- or post-transfer. Decisions such as the desired quality and size of an image, whether authorship or copyright metadata should be included, and whether images should be deleted after transfer or merely copied to the server, all can be made as a result of such policies.

Regardless of the operational mode and policies in place, a user may be apprised of the upload progress via information displayed on the camera's image screen. That is, the present invention leverages the ability of conventional DSCs to display images and/or play movies to apprise the user of the status of an upload of images or other data over a wireless network, even though the camera is not configured for such transfers.

In one embodiment of the present invention this functionality is achieved as follows. When the user wishes to upload one or more images he or she selects a file stored on the media card. Rather than a simple image file however, this file acts as a trigger for the media card to initiate the upload. Such a file may be stored on the media card at the time of its manufacture or as part of the initial configuration process described above. Preferably, the file is associated with an image that indicates the nature of the file so that when selected during playback the user is prompted to "play" the file in order to initiate the upload. That is, the file may be associated with an image that includes text instructing the user to "Press Play to Initiate Image Upload" or similar information.

Upon selecting play (or a similar command), the file will cause the processor of the media card to execute computer-readable instructions to transmit the stored images over the wireless network. In addition, a user interface of sorts may be displayed to the user. The user interface may consist of a series of images or a movie that are designed to apprise the user of the status of the upload. As shown in FIG. 4A for example, a first image 48 in the sequence may report the status of the connection to the wireless network. Subsequent images 52 in the sequence, as shown in FIG. 4B, may also include a thumbnail 50 of the digital image being transferred, and an updated status display showing progress to date. The progress bars are not, however, real-time progress bars but rather stored images that are played out as the wireless radio reports of the progress of the image transfer. As the transfer progresses, images with more complete status bars may be played to the user to give the illusion of a real-time progress update. The playback of these images (or a movie) will stop (or a "completed" image displayed) once the image transfer is complete. The wireless radio can thereafter be turned off.

Various embodiments of the present media cards may incorporate means for restricting user-access to high resolution digital image files stored thereon. That is, some media cards configured in accordance with embodiments of the present invention may include a security layer that binds the stored images to a particular photofinishing provider. This security is based on a shared secret maintained on the media card as well as at the provider. As a result, the media card must be physically provided to an authorized photofinisher for processing, or unlocked within the context of a secure, authenticated network session, in order to gain access to the high resolution images stored on the media card (e.g., for printing or other publishing). It is worth noting that access to images stored on a media card configured in accordance with the present invention can be restricted in either or both of two ways: over the wireless interface (by authenticating the server endpoint and restricting the choice of image destination) or over the host interface (as discussed immediately above). Alternatively, or in addition, the online destination may be restricted (e.g., on a per user basis) at the server layer, as a lighter form of investment protection than on-card image locking.

The ability to restrict access to high resolution images stored on the media card is made possible through an understanding of the file system layer, which governs the layout of files and directories (file groupings) across the raw storage blocks of the media card. Thus, individual files may be classified into one (or more) of several content types, and additionally, specific policy(ies) applied to files of each content class. Policies can enforce file system permissions, e.g., by withholding write or delete access. Policies can also specify type-appropriate operations on the files themselves. The ability to dynamically add or modify content and to observe user access to the content allows for establishing a limited user interface channel through the host device (e.g., a DSC). Status can be communicated to the user via informative still or moving images as discussed above. User input can be detected based on file access patterns, including read, modify or delete operations.

The present access control scheme allows an authorized host (e.g., a computer system resident at or associated with a media card processing facility) to operate at a higher privilege level ("unlocked") than is accorded to an un-authenticated host ("locked"). Media cards configured in accordance with the present invention do not assume or require any functionality outside conventional, industry standard-compliant media card functionality when operating with an un-authenticated host. Unlocking can occur in tandem with physically returning the un-authenticated host device to an authorized service location, or across a network using appropriate (and conventional) authentication techniques. Policies may take into account whether the card is locked or unlocked at the time an operation is performed, allowing more flexibility than traditional "all-or-nothing" access control schemes (e.g., a password protected drives or partitions).

In one embodiment, a media card configured in accordance with the present invention provides a still and/or moving image store for a DSC. The media card is locked while in the user's hands, and the policies set forth in Table 1 may be applied.

TABLE 1

Sample Policies for Media Card in Un-authenticated Host Device

| Content Class | Locked? | Policy |
| --- | --- | --- |
| Still Image, JPEG format | Yes | Transparently replace image with screen resolution thumbnail |
| Still Image, JPEG format | No | Restore original image |
| Moving Image, AVI format | Yes | Quota bytes written |
| Moving Image, AVI format | No | Reset quota |
| Other (unknown format) | Yes | Access error on read |

To better appreciate the access controls provided in accordance with embodiments of the present invention, it is appropriate to review some underlying characteristics of conventional removable media and host devices. Most DSCs available today employ non-volatile storage devices inserted into their "digital film" slots. These non-volatile storage devices use a "FAT" or file allocation table format to store images captured by the DSC. The FAT file system has its origins in MS-DOS, and several variants are in use (e.g., FAT-16 and FAT-32). FAT is specified for use in digital cameras as part of the JEITA CP-3461 standard, better known as DCF 2.0. In addition to the file system, DCF 2.0 (Sections 3.2 and 5) specifies a directory hierarchy as well as directory and file naming conventions that are a subset of FAT's 8+3 naming scheme.

Before storing images into a storage device (e.g., a flash memory of a media card), the DSC will determine whether the device has been formatted in accordance with the DCF specification. If not, the camera will prepare the memory device to store data in an organized fashion through a process called "formatting." Formatting logically erases all existing data stored in the memory device and writes an empty file system structure in the FAT format. The camera's FAT software writes an empty File Allocation Table, which marks all data clusters to be available for storing new files into. An empty folder structure is written by initializing an empty Root Directory Structure. The camera will then create new folders, in accordance with processes outlined in the DCF specification, to provide logical separation of images stored into the memory device (e.g., folders for different cameras that the memory device may be used in concurrently, for different dates that the user takes pictures on, etc.).

JEITA CP-3451 "Exchangeable image file format for digital still cameras", better known as EXIF, is a companion to the DCF specification. EXIF specifies image, sound, and tag formats for storage within the file system structure mandated by DCF. For example, and as alluded to above, EXIF tags for "artist" (i.e., photographer) information and/or date/time information can be used. The photographer information can be gathered from user-provided account information. In addition, timezone references can be added in accordance with the present invention by using GPS data to determine the corresponding timezone and writing such information and/or an absolute time into a UTC-referenced GPSDateStamp field. In addition, the information regarding peers (e.g., other users/DSCs present at or near the location of a DSC having a media card configured in accordance with the present invention) can be written to the MakerNote tag. As with location metadata, processing of such information can be performed in the media card, in the server layer or in a combination of these devices.

EXIF specifies the use of JPEG, known formally as ISO-IEC 10918-1/ITU-T Recommendation T.81, for compressed images, and Adobe TIFF 6.0 for uncompressed images. Images of either format are annotated with TIFF-style tags, recording camera and image parameters. The WAV format is specified for audio annotations, which are to be associated with captured images.

In order to take advantage of the non-volatile storage medium, it is expected that a camera will flush metadata as well as data block updates to the flash at the end of each operation. Nonetheless, it is possible for a camera implementation to cache some or all of the FAT file system metadata, relying on a write-through cache discipline to keep the flash storage in sync. As a result, updates to the metadata performed by the media card may not be observed until the camera is next powered up, or whenever the metadata cache is refreshed.

FAT file attributes can be used to mark a file read-only. DCF 2.0 (Section 5.2.2.4) specifies support for the Read Only attribute to prevent accidental deletion (though some DSCs may not respect this attribute). Some cameras allow toggling of the Read Only attribute (often represented as a key icon on the preview screen).

When an image is taken, a file is created within the file system by the camera, after which the sequence of digital data encoding the image is stored in the file. The data is usually formatted in a conventional compressed image format (such as JPEG), as specified by DCF. In order to complete the action of creating the file and storing the image data, the camera must go through the following set of actions (assuming there is free space available on the device), although not necessarily in this exact order:

1) Starting with the Root Directory Region of the file system, traverse the file system blocks representing the directory hierarchy stored on the device to find the Directory Table block for the directory (folder) into which the new image is to be stored.
2) Add an entry to that Directory Table block describing the new file being created. This contains information about the name of the file and where within the file system the beginning of the data (i.e., the first data block) for that file resides.
3) Find a free data cluster based on the information stored in the File Allocation Table. Mark that data cluster as being used and store the a cluster's worth of image data in the continuous range of blocks representing the cluster (FAT allows the cluster size to be configured at the time the file system is created and indicates this size between 2 KB and 32 KB in the File Allocation Table structure).
4) Repeat step 3 as needed until all bytes of the image data are written to the file system. As each new cluster of data is written, singly-link it from the previous cluster such that the image file can be read in a logically contiguous fashion even if the data clusters are scattered around the media that the file system is stored on.

All file system updates performed by the digital camera host appear as write accesses to the flash storage proxied by the media card storage device. The media card firmware can detect the completion of these sets of operations using a series of heuristics to be compatible with a wide range of implementations of the file system operations in digital still cameras:

1) Wait for a pre-determined amount of time to expire after the time of the last write access to the flash storage by the host device. If more write accesses occur during the timeout period, assume that the host device is continuing to update the file system, reset the timer and keep waiting.

2) Once the timeout expiration occurs, scan the directory structure of the file system and detect if any new files have been created since the last scan by comparing the directory structure against a copy that was saved during the last scan.

3) For each new file that was detected, walk the singly-linked list of data clusters until the end of the list, at which point the number of data bytes stored in the data clusters should match the size of the file as indicated in the Directory Table entry for the file. If the scan terminates early, assume that the expiry timeout during step 1 was too short, invalidate the scan results, increase the timeout and go back to step 1 to allow the host device to complete updating the file system.

When the media card's firmware detects the completion of the creation of new image files on the file system, it starts a background task, running at a lower priority to allow normal data access operations to remain unhindered, to create scaled down versions of the new images. For each new image created by the external host (most commonly the DSC):

1) Read the JPEG header of the file to get information on the resolution (width and height in pixels) of the image. If the JPEG image contains an optional EXIF header, inspect the header for the presence of a camera orientation indication to detect whether the picture was taken in landscape (larger dimension along the top of the image) or portrait (smaller dimension along the top of the image) orientation. If the EXIF information is not available, assume a landscape image if the width of the image is greater than the height or a portrait image otherwise.

2) Using the resolution and orientation information from the image, pick one of the scaling ratios of 1:1, 1:2, 1:4, 1:8 or 1:16 to reduce the resolution of the image as close as possible, but no smaller than, 320 pixels by 240 pixels for landscape orientation images and 240 pixels by 320 pixels for portrait orientation images while maintaining the aspect ratio of the original image. These scaling ratios are unique in that the computational overhead of JPEG decompression can be reduced to make the operation take far less time compared to a complete decompression followed by an arbitrary ratio scaling. In some embodiments this scaling ratio can be a programmable feature definable by a service provider offering the media device and the ratio can be any ratio or ratios selected by the provider (including 1:1, i.e., no reduced resolution). After the combined JPEG decompression and fast-scaling-by-fixed-ratio operation, further scale the image by simple decimation to have one dimension equal 320 pixels or 240 pixels depending on the aspect ratio of the original image.

3) Write a new compressed JPEG file containing the scaled image into the flash memory by allocating data blocks from the database of free physical blocks, without providing any new logical-to-physical block address mappings for the file system.

4) In an atomic operation, scan the FAT file system structure corresponding to the original image file to change the physical-to-logical address translation of the data blocks containing the FAT data clusters of the file. Specifically, update the mappings of the first N blocks where N is the number of blocks amounting to the size of the scaled image that was written in step 3 to translate to the physical block addresses holding the scaled image. Remove the mappings for the blocks holding the remainder of the data clusters for the file (the original file, being a much higher resolution image, contains many more blocks than the scaled image).

5) Add a tracking entry to the persistent mapping database to associate the now orphaned physical blocks holding the original unmodified image file with the FAT filename (including the complete folder path) of the scaled image (which, from the camera perspective, now appears in place of the original full-resolution image file). This association does not represent a block-level mapping, but a mere hint to the firmware that if the camera (or another external host) ever deletes the file corresponding to the scaled image, the media card should free the physical blocks corresponding to the full-resolution image, effectively deleting it.

After the completion of these steps, each image captured by the DSC and stored onto the storage device has been replaced by an identical image at a lower resolution (the original high resolution images still are stored on the media, but are inaccessible to the host). These reduced-resolution images are directly accessible by the DSC, allowing the user to use the review and display features of the camera and make choices about keeping or deleting images. The physical flash memory blocks holding the data from the original full-resolution image have no logical-to-physical address mappings within the media card, so the camera or any other host accessing the media card cannot retrieve the high-quality full-resolution image for viewing, printing or transmission by using block-level access semantics. Those data blocks are secured from any external access to the media card until a higher-level authentication exchange takes place between the device and an authenticated/authorized host.

One of the challenges of performing image manipulation of the type described above is that DSC manufacturers may choose to support only a limited subset of DCF directory structure and JPEG file syntax. The camera may also rely on vendor-specific EXIF header fields, for example to determine image orientation. Camera implementations often assume that only they will write to the media card; that is, the card is dedicated to a single camera, and a PC host will only read/delete images. This implies that the only images the camera is guaranteed to read properly are ones the camera itself has formatted. The corollary is that inconsistently formatted images may cause undesirable, and in general unpredictable, behavior in camera. We refer to this vendor- or camera-specific formatting as "Camera Normal Form", and adhere to it when creating reduced resolution versions of images generated by the camera. Note that these issues are also relevant for preloading still or moving image content, and may require the user to capture an image with the camera before the card can ascertain the appropriate CNF with which to present any preloaded images.

If the user chooses to delete any of the images that were taken with the camera previously, the camera needs to update the file system information on the storage device. Specifically, the camera:

1) Writes to the Directory Table block for the folder containing the image to be deleted, removing the name and file system information for the file corresponding to the image from the table.

2) Updates the File Allocation Table blocks to mark the data cluster blocks used by the deleted file as free.

The file system update detection mechanism described earlier detects these operations as well, as all file system updates performed by the digital camera host, including file deletions, appear as write accesses to the flash storage. Upon going through the directory structure scan following the update detection, if the media card firmware notices that some files are now missing from the updated scan results, it infers that those files have been deleted from the file system. At this point, the media card needs to take action because the files that were deleted by the camera were not the original full-resolution copies of the image, but rather the scaled-down replacements. By using the information that was associated with the filenames of images that were replaced by the scaled-down copies, the firmware locates the physical data blocks in the flash memory that correspond to the high-resolution version of the deleted files and returns those blocks to the pool of free physical blocks in the persistent database.

In a further embodiment of the present invention, the consumer-side cost of media card may be subsidized by a provider and/or consumers are "locked-in" to a particular provider's print fulfillment and other services "network". Recall that the media card may act functionally as a security mechanism that restricts access to the print-worthy, full-resolution copies of users' photos. During normal operation, the user can take pictures, review them on the viewing screen of the camera, delete unwanted pictures and even download limited screen-resolution copies of the pictures to a personal computer (e.g., either via a media card reader or by using the camera's own PC-connectivity solution). In all of these user-driven operations where the media card is in "locked" (or un-authenticated) mode, the only memory blocks that can be accessed are the ones that hold the previously scaled-down versions of the pictures. Once the media card is returned to an authorized processing location for processing, that processing station (e.g., a personal computer running appropriate software) unlocks the media card and delivers the full-resolution images to the provider's digital photo services pipeline. Note that authentication for printing or other processing can take place on a per-visit/per-media card basis (e.g., an authentication may be valid for all stored images) or per-picture basis (e.g., authentication may apply only to specific pictures retrieved from the device) to facilitate various billing options.

Figure 5:
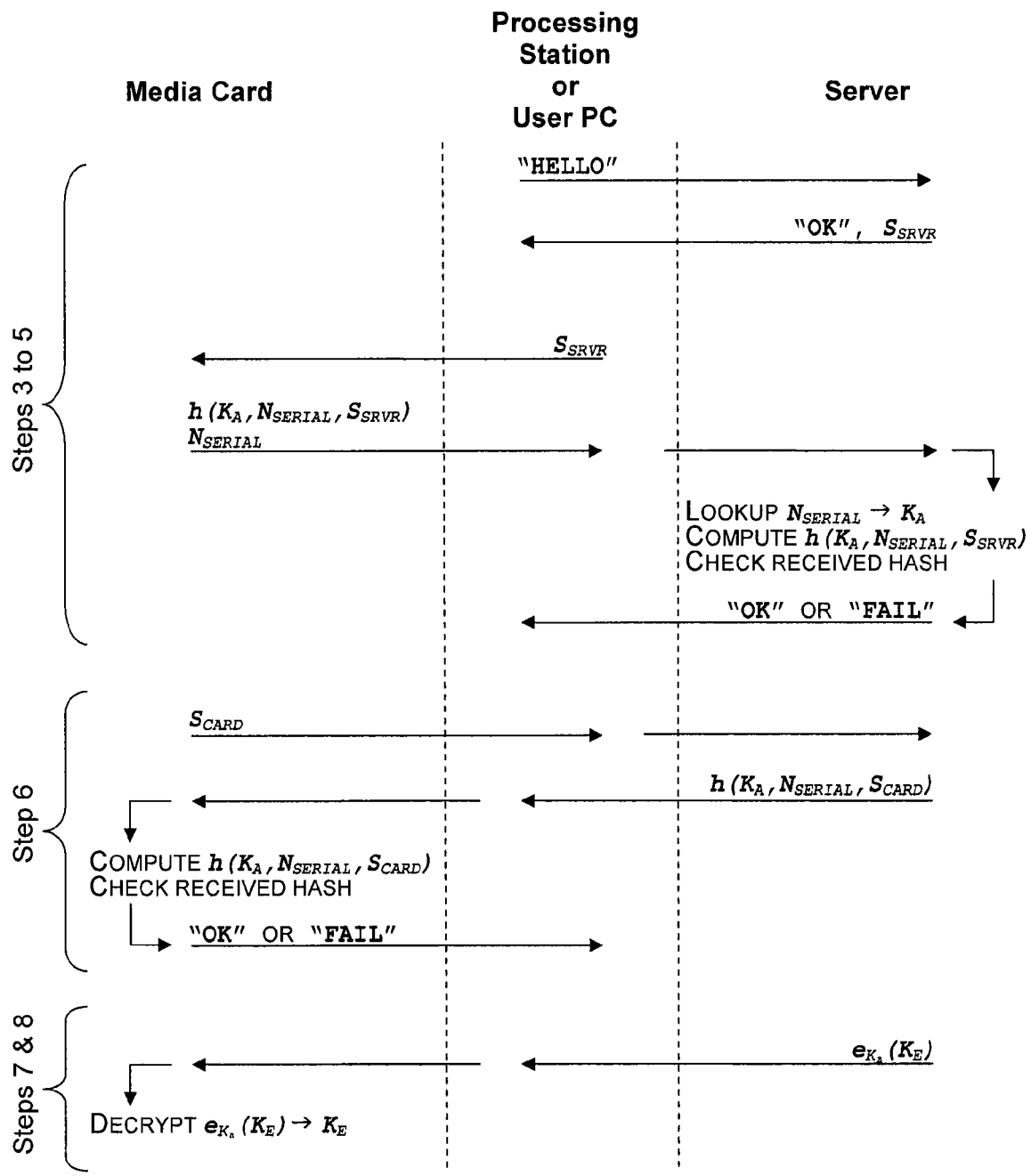
FIG. 5 illustrates steps for setting up and operating an authentication mechanism of a media card configured in accordance with embodiments of the present invention.

The steps for setting up and operating the authentication mechanism built into a media card configured in accordance with embodiments of the present invention are as follows (refer to FIG. 5):

1) Before a media card is provided to a user, an authentication key ($K_A$) made up of random bits with sufficient cryptographic entropy is selected. This key is stored in a region of the flash memory that is never accessible to users (e.g., the same area that holds the firmware). A copy of the key is retained in an authentication database and associated with the serial number of the corresponding media card (the serial number may also be present in the device's firmware in an unrestricted readable region).

2) During normal operation, the media card controller and firmware remain in the "locked" mode, replacing the pictures taken by users with screen-resolution thumbnails and securing the full-resolution originals as described above.

3) When a media card is returned to an authorized processing location, the processing software initiates the authentication operation by contacting an authentication server (e.g., hosting the authentication database) with a session initiation message and receives an encryption salt ($S_{SRVR}$) dynamically derived from a linear-feedback shift register (LFSR) counter and the time of day. The server associates this salt with the established connection and remembers it for the rest of the exchange. The dynamic nature of this salt eliminates the possibility of replay attacks if the unlocking station is compromised or is running malicious software.

4) The processing station then presents the salt received from the server to the media card being unlocked. The device responds by providing a strong cryptographic hash (such as MD5) computed over the secret authentication key ($K_A$), the serial number of the device ($N_{SERIAL}$) and the server salt ($S_{SRVR}$). The computed hash and serial number are transmitted to the server.

5) The server uses the serial number to look up its copy of the media card's secret key in the authentication database. Using that key, the serial number provided by the unlocking station and the server salt associated with this connection (remembered from step 3), the server computes the cryptographic hash using the same algorithm employed by the media card in step 4. If the hash computed by the server is identical to the one received from the unlocking station, the authentication succeeds and the legitimacy of the media card can be trusted. If the hash comparison fails, the server indicates an authentication failure and terminates the connection.

6) At this point the authentication server can trust that a valid media card is present at the other end of the connection (and not, for example, an arbitrary software automaton that may be trying to gain access to the database and mine it for information), but the authenticity of the server is not yet proven to the media card. The device provides its own dynamically-generated salt ($S_{CARD}$) which is transmitted to the server by the unlocking station software. The server applies the same cryptographic hash function that was employed in steps 4 and 5 to compute a signature using the secret key, the serial number and the salt provided by the device. This signature is offered back to the media card, which computes its own copy of the hash using its knowledge of the $K_A$, $N_{SERIAL}$ and $S_{CARD}$. If the computed hash matches the one received from the server, the authenticity of the server is proven because the hash can only be computed correctly with knowledge of the authentication key $K_A$.

7) With the successful completion of step 6, the media card and the server are assured of their mutual authenticity. Furthermore, no trust is placed in the processing station which is acting as an intermediary during the transaction because the data transmitted therethrough is comprised of strong cryptographic hashes that are dependent on a shared secret ($K_A$) between the server and the device, but make it impossible (or computationally very expensive) to derive the secret knowing the resultant hashes and the other two constituents of the hash operations due to the irreversibility. At this point the server picks an encryption key ($K_E$), which can be a dynamically-generated one-time key or another pre-computed key that was stored in the database, encrypts it using $K_A$ and a cryptographic algorithm such as 3DES and transmits it to the unlocking station. The unlocking station provides this encrypted key to the media card, which decrypts it using $K_A$ and retrieves the unencrypted key $K_E$ which is used for the remainder of the bulk-data transfers off of the card.

8) With the successful arrival of the bulk-data encryption key the media card enters its "unlocked" state, whereby the FAT file-system presented by the device makes available the full length of the data stored in the files representing the full-resolution photos taken by the user. However, when the operating system running on the unlocking station reads the blocks in the flash memory that correspond to the FAT data blocks for the files, each block of data is returned to the host via the physical interface (Compact Flash (CF), Secure Digital (SD), etc.) after being encrypted by the bulk-data key $K_E$. The encrypted data is not usable by the processing station because $K_E$ is not known to it.

9) If the processing station is associated with an authorized photo-finishing vendor (such as a retail outlet, a wholesale printing service) whose identity can established to a sufficient degree of certainty based on its network address and an identity certificate (such as those employed by SSL), the authentication server can share the bulk-data key $K_E$ with the processing station to allow it to decrypt the data retrieved from the media card and make immediate use of the images.

10) If the processing station is not such a vendor (e.g., if it is a user PC), then the unlocking is more restricted. In this case the data retrieved from the media card is sent in its encrypted form to the authentication server, where it is decrypted and uploaded to the provider associated with the serial number of the media card (e.g., as retrieved from the authentication database). 11) Alternatively, the media card can offer both user PC and authorized processing station hosts the ability to directly receive and decrypt individual pictures. In this mode, the processing station sends a request for a specific picture (based on, for example, its filename) to the media card. The media card dynamically generates an encryption key ($K_p$) for the picture and associates it permanently with that picture by storing in a non-host-accessible portion of the flash memory so that it may be reused for subsequent decryptions. It then encrypts the picture key with the authentication key $K_A$ and returns the encrypted results to the processing station. The processing station then contacts the authentication server and makes the request to decode the specific picture and passes along the encrypted picture key. If the authentication server decides that the processing station is authorized to decrypt this individual picture and get access to its full-resolution copy, based either on a pre-determined trust or authorization, or a just-in-time authorization operation (such as credit card billing), it decrypts the received picture key with $K_A$ and returns it to the processing station, which can then use the plain-text key to decrypt the contents of that individual picture as it is read off the media card.

Thus, content-aware digital media storage devices compatible with existing specifications for media card formats for digital imaging and other devices have been described.

What is claimed is:

1. A method, comprising:

proxying a transfer of data representing a digital image captured by a host digital camera to a storage medium of a removable media card housed within the digital camera via a firmware-controlled logical-to-physical mapping of addresses of said storage medium at which said data is to be written, the firmware being stored in the removable media card;

in conjunction with storing the data representing the digital image, storing metadata concerning the digital image in the storage medium of the removable media card, said metadata comprising any of information concerning settings of the host digital camera when the digital image was captured, a location at which the digital image was captured, an identity or comments of a user of the host digital camera, an identity of others in a vicinity near the location at which the digital image was captured, or time information, wherein the metadata concerning time and/or location is derived from any of a global positioning system (GPS) receiver, information concerning wireless networks determined to be near the removable media card when the digital image was captured, information concerning wireless networks detected by the removable media card, or combinations of any of the foregoing;

the data representing the digital image and metadata from the storage medium of the removable media card to a management layer said transferring being made via a wireless radio transceiver included in the removable media card and a wireless network access point with which the wireless radio transceiver of the removable media card is associated, and said transferring being made only after said management layer authenticates a user associated with the removable media card according to a binding between the user and the removable media card; and transferring the data representing the digital image from the management layer to an electronic photo album following manipulation of the digital image so as to be receivable by the electronic photo album, the management layer isolating the media card from the electronic photo album.

2. The method of claim 1, wherein the electronic photo album is maintained at a computer resource other than the management layer.

3. The method of claim 2, wherein prior to transferring the data representing the digital image from the management layer to the electronic photo album, the digital image is associated with the metadata concerning the location at which the digital image was captured by the host digital camera.

4. The method of claim 3, wherein the metadata concerning the location at which the digital image was captured is derived from GPS data.

5. The method of claim 3, wherein the metadata concerning the location at which the digital image was captured is derived from information concerning wireless networks determined to be near the media card when the digital image was captured by the host digital camera.

6. The method of claim 3, wherein the metadata concerning the location at which the digital image was captured is derived from information concerning wireless networks detected by the media card.

7. The method of claim 3, wherein the digital image is further associated with the metadata comprising identity information concerning the user of the host digital camera.

8. The method of claim 3, wherein the digital image is further associated with the metadata comprising identity information concerning other users in the vicinity of the location at which the digital image was captured by the host digital camera.

9. The method of claim 3, wherein the digital image is further associated with metadata comprising a time zone referenced timestamp concerning a the location at which the digital image was captured by the host digital camera.

10. The method of claim 2, wherein prior to transferring the data representing digital image from the management layer to the electronic photo album, the digital image is transcoded so as to be compatible with image format requirements for storage in the electronic photo album.

11. The method of claim 1, wherein upon successful transfer of the data representing the digital image from the removable media card to the management layer, the data representing the digital image is automatically deleted from the storage medium of the removable media card.

12. The method of claim 1, wherein the management layer is configured to permit image retouching by the user.

13. The method of claim 1, wherein the management layer is configured to ensure reliable transfer of the data representing the digital image between the removable media card and the electronic photo album.

14. The method of claim 13, wherein the management layer is configured to manage interrupted or duplicate transmissions of the digital image.

15. The method of claim 13, wherein the management layer is configured to notify the user of successful transfer of the digital image.

16. The method of claim 1, wherein the management layer is configured to deliver copies of the digital image as attachments to a message.

\* \* \* \* \*